United States Patent [19]

Appel

[11] 4,028,770
[45] June 14, 1977

[54] WINDSHIELD WIPER ASSEMBLY

[76] Inventor: Walter D. Appel, 4350 Commerce Road, Orchard Lake, Mich. 48033

[22] Filed: Sept. 15, 1975

[21] Appl. No.: 613,075

[52] U.S. Cl. .............................................. 15/250.42
[51] Int. Cl.² .......................................... B60S 1/38
[58] Field of Search ..................... 15/250.36–250.42

[56] References Cited

UNITED STATES PATENTS

| 3,097,389 | 7/1963 | Contant et al. | 15/250.36 |
| 3,099,031 | 7/1963 | Ludwig | 15/250.42 |
| 3,408,680 | 11/1968 | Heller | 15/250.42 |
| 3,881,213 | 5/1975 | Tilli | 15/250.42 |
| 3,903,560 | 9/1975 | Jewell et al. | 15/250.42 |
| 3,919,736 | 11/1975 | Bourassa et al. | 15/250.42 |
| 3,958,295 | 5/1976 | Green et al. | 15/250.42 |

Primary Examiner—Peter Feldman
Attorney, Agent, or Firm—Harness, Dickey & Pierce

[57] ABSTRACT

A windshield wiper assembly is disclosed as comprising a one-piece blade superstructure fabricated of a molded polymeric material having a curvalinear shape such that uniform wiping pressure is applied along its entire length as a result of a force being exerted at the center of the superstructure by means of an ancillary wiper arm, the superstructure being provided with a resilient windshield engaging wiper blade which is secured to the superstructure by a coextensive retainer member adapted to be secured to the superstructure by means of a plurality of longitudinally spaced retaining finger formed integrally of the superstructure.

1 Claim, 6 Drawing Figures

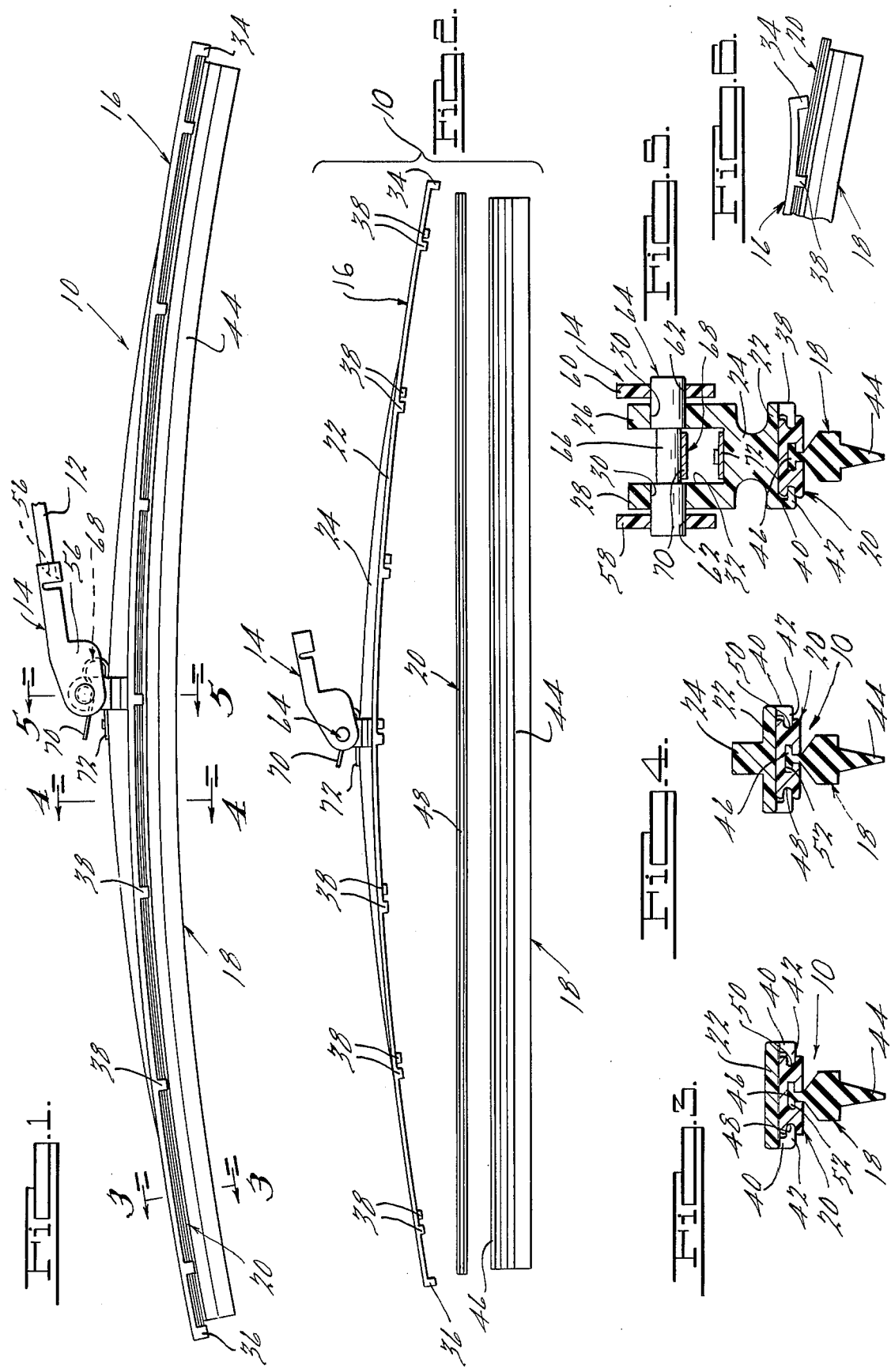

WINDSHIELD WIPER ASSEMBLY

BACKGROUND AND SUMMARY OF THE INVENTION

U.S. Pat. No. 3,192,551, issued July 6, 1965, discloses a windshield wiper blade assembly having a one-piece resilient backbone member or superstructure fabricated of a suitable resilient, metallic material and designed such that uniform wiping pressure is exerted along the entire length of an associated wiper blade by means of a wiper arm acting at a central point along the superstructure. The uniform wiping pressure is achieved by forming the wiper superstructure in a curvalinear manner with a radius of curvature less than that of the windshield to be traversed thereby, together with varying the width and/or thickness of the superstructure member from a maximum through the central arm attachment point to a minimum at the opposite ends thereof, with the width and/or thickness and degree of curvature being proportioned or correlated with the modulus of elasticity, load and length of the blade, so as to assure for the desired uniform wiping pressure.

The present invention embodies a number of improved features over the wiper blade construction shown in the aforesaid U.S. Pat. No. 3,192,551 and thus, while being related in principle to the windshield wiper blade assembly disclosed therein, the present invention incorporates significant improvements which provide for improved economy of production, operation and assembly as compared to the blade assembly as shown in said patent.

It is accordingly a general object of the present invention to provide a windshield wiper blade assembly which features a number of improvements over the comparable unit shown in U.S. Pat. No. 3,192,551.

One of the primary areas of improvement of the present invention over the construction shown in the aforementioned U.S. Pat. No. 3,192,551 resides in the fact that the superstructure or backbone member embodied therein is fabricated of a one-piece, molded, polymeric material, which may be conveniently molded by any one of a number of suitable well-known and highly accepted techniques. The fabrication of the superstructure of such material not only lends itself to a highly durable, corrosion resistant structure, but also one which may have the color pigmentations embodied integrally thereof so as to obviate the need for subjecting the superstructure to subsequent printing, anodizing or other coloring and/or corrosion preventative treatments.

It is accordingly another object of the present invention to provide a new and improved windshield wiper blade assembly which has the main superstructure or backbone member thereof fabricated of a molded plastic material.

Another feature of the present invention over that shown in the aforementioned U.S. Pat. No. 3,192,551 resides in the fact that the associated wiper blade is secured to the superstructure by means of a coextensive retainer member which, like the superstructure, may be fabricated of a molded plastic material. The retainer member is designed so as to have a coextensive slot extending along the underside of the entire length thereof, which slot is adapted to nestingly receive a complementary-shaped portion of the wiper blade. The entire assembly consisting of the wiper blade and retainer member is adapted to be secured to the superstructure by means of a plurality of downwardly projecting fingers or retainer elements formed integrally of the superstructure and adapted to be received within laterally opposed recesses formed along the opposite sides of the retainer member. This arrangement provides for positive retention of the wiper blade and retainer member within the confines of the superstructure, and assures that the wiper blade will assume the curvalinear shape to which the suuperstructure is formed. Moreover, such a construction permits convenient removal of the blade for purposes of repair, replacement, inspection, etc.

It is a further object of the present invention to provide a windshield wiper assembly which embodies a novel wiper blade retainer member and means for releasably securing the same to the molded plastic superstructure associated therewith.

Other features and advantages of the present invention will become apparent from the following detailed description taken in conjunction with the accompanying drawings.

BRIEF DESCRIPTION OF THE DRAWINGS

FIG. 1 is a longitudinal side elevational view of the windshield wiper blade assembly incorporating the principles of the present invention;

FIG. 2 is an exploded assembly view of the windshield wiper blade assembly shown in FIG. 1;

FIg. 3 is an enlarged transverse crosssectional view taken substantially along the line 3—3 of FIG. 1;

FIG. 4 is an enlarged transverse cross-sectional view taken substantially along the line 4—4 of FIG. 1;

FIG. 5 is an enlarged transverse cross-sectional view taken substantially along the line 5—5 of FIG. 1; and FIG. 6 is a fragmentary side elevational view of a portion of the wiper assembly of the present invention with the wiper blade and retainer member partly removed.

DESCRIPTION OF A PREFERRED EMBODIMENT

Referring now in detail to the drawings and in particular to FIG. 1 thereof, a windshield wiper blade assembly 10, in accordance with one preferred embodiment of the present invention, is shown in operative association with a portion of a conventional pivotal wiper arm 12 which is secured by means of a connector 14 to the assembly 10. As is well known in the art, the arm 12 is adapted to pivot or oscillate back and forth adjacent the associated windshield, thereby causing the blade assembly 10 to move across and in wiping contact with the adjacent surface of the windshield to effect removal of moisture, road dirt, etc., therefrom.

Generally speaking, the wiper blade assembly 10 comprises a wiper blade superstructure which is of a one-piece molded construction and is generally designated by the numeral 16. The superstructure 16 is provided with a coextensive wiping blade 18 which is secured to the superstructure 16 by means of a coextensive blade retaining member 20. As will hereinafter be described in detail, the retaining member 20 is adapted to secure the blade 18 to the superstructure 16 in a manner such that the blade 18 will assume the generally curvalinear or arcuate shape shown in FIG. 1, and permit the blade 18 to be conveniently removed from the superstructure 16 for purposes of repair, inspection, replacement, etc.

Referring now in detail to the construction of the superstructure 16, as best seen in FIGS. 1 and 3–5, the superstructure 16 is comprised of a generally flat, uniform thickness arcuately-shaped body portion 22 which is formed with an integral upwardly projecting reinforcing rib 24 on the upper side thereof. The rib 24, as best seen in FIG. 5, is formed with a pair of upstanding flanges or ears 26 and 28, which in turn are formed with aligned bores or apertures, generally designated by the numeral 30. The flanges 26, 28 define a cavity or recess 32 therebetween adapted to nestingly receive a portion of the connector 14 in a manner hereinafter to be described.

As previously mentioned, the superstructure 16 is formed in a generally arcuate or curvalinear shape, as best seen in FIG. 1, whereby to provide a substantially uniform wiping pressure of the wiper blade 18 against the associated windshield. As described in U.S. Pat. No. 3,192,551, which patent is incorporated by reference in the description portion of this specification, the aforesaid uniform pressure may be accomplished by forming the superstructure 16 such that it assumes a generally arcuate configuration of a predetermined radius in a free form or state so that as the superstructure 16 is moved normally toward the windshield surface, the opposite ends of the associated blade would make initial contact, with progressive contact being made by the blade with the windshield from the ends thereof toward the center as increasing pressure is applied at the center. The particular radius of curvature is, of course, dependent upon the length, thickness, width and modulus of elasticity of the material from which the superstructure 16 is fabricated, and for a given modulus of elasticity, relatively thinner or narrower sections will require relatively greater deflection. In addition to forming the superstructure in the aforesaid arcuate configuration, it is contemplated that the width of the body 22 thereof may be tapered from a maximum width at the center thereof to a minimum width at the opposite ends thereof. A similar result may be achieved by constructing the body 22 of a uniform width and uniformly tapering the thickness thereof from a maximum thickness at the center thereof to a minimum thickness at the opposite ends. As stated in the aforementioned United States patent incorporated by reference herein, it is also possible to combine, in a number of different ways, the various constructional approaches incorporating progressive dimensional variations in free-form curvature, width and/or thickness to provide a superstructure 16 having the desired uniform pressure loading characteristics. It will be noted that while theoretically, the opposite ends of the superstructure 16 would taper to zero thickness and/or width to provide the desired uniform pressure loading along the entire length of the associated blade, in order to assure against undesirable twisting and provide the necessary torsional stiffness for the associated blade and retainer member to achieve proper wiping during back and forth wiping movement of the blade, the opposite ends of the superstructure 16 are formed of a uniform thickness and width for a distance inwardly or centrally of the superstructure sufficient to assure such stiffness. Preferably, the uniform thickness end portions extend inwardly approximately one third of the distance between the end stops 34, 36 and the central portion of the superstructure 16.

As best seen in FIGS. 1 and 2, the opposite ends of the body 22 of the superstructure 16 are formed with a pair of downwardly projecting shoulders or end stops 34 and 36. In addition, the underside of the body 22 is formed with a plurality of longitudinally spaced pairs of downwardly projecting L-shaped retaining legs or fingers, generally designated by the numeral 38. As best seen in FIGS. 3–5, each of the fingers 38 comprises a generally downwardly projecting portion 40 and a laterally inwardly projecting portion 42. The fingers 38 of each of the pairs thereof may be laterally aligned or slightly laterally offset, as seen in FIG. 2. The longitudinal spacing of the pairs of fingers 38 is such that when the retaining member 20 and blade 18 secured thereto are engaged with the fingers 38, the blade 18 and member 20 will assume the same arcuate configuration as the superstructure body 22, as best seen in FIG. 1. Accordingly, the particular number of pairs of fingers 38 will vary with the degree of curvature of the body 22 and the longitudinal length thereof.

As best seen in FIGS. 3–5, the blade 18 is formed with a downwardly projecting wiping lip section 44 which is adapted for engagement with the surface of the associated windshield in a manner well known in the art. The blade 18 also comprises a generally upwardly projecting T-shaped section 46 that is coextensive of the wiping lip 44. The sections 44 and 46 are connected by a reduced thickness intermediate portion of the wiper blade 18 which permits relative flexing therebetween as the assembly 10 oscillates back and forth across the associated windshield, as is well known in the art.

As shown in FIGS. 3 and 4, the retaining member 20 is of a uniform cross-sectional shape and is formed with a pair of laterally inwardly projecting slots or recesses 48 and 50 on the laterally opposite side edges thereof. The slots 48, 50 are adapted to nestingly receive the inwardly projecting portions 42 of the retaining fingers 38 formed on the superstructure 16, with the result that the retaining member 20 will assume the operative position shown in FIG. 1. The retaining member 20 is also formed with a generally T-shaped slot 52 in the underside thereof which slot 52, like the slots 48, 50 is coextensive of the member 20 and is adapted to nestingly receive the T-shaped section 46 of the wiper blade 18. As shown in FIGS. 3 and 4, the slot 52 and T-shaped section 46 are complementary in shape and are so dimensioned as to permit relatively free sliding movement between the members 18, 20 to facilitate assembly and disassembly thereof.

The connector 14 comprises a connector body which is preferably, although not necessarily, fabricated of a molded plastic material and is provided with a blind bore or recess 56 adapted to removably receive the adjacent end of the wiper arm 12 with suitable releasable means (not shown) being provided to releasably secure the connector body 54 to the arm 12. The body 54 includes a pair of downwardly projecting side portions 58, 60 which are spaced sufficiently away from one another so as to lie outwardly from the flanges 26, 28, when the connector 14 is assembled onto the superstructure 16, as best seen in FIG. 5. The side portions 58, 60 are formed with aligned bores 62 which are intended to be axially aligned with the bores 30 of the flanges 26, 28 and receive a suitable pivot pin, generally designated by the numeral 64. As shown in FIG. 5, the pin 64 is formed with a reduced diameter central portion 66 and is intended to be secured in place by means of a suitable U-shaped or hair-pin spring element 68, one leg 70 of which is adapted to engage the portion 66 of the pin 64, while the other leg 72 is adapted to bear against the interior of the cavity 32. At such time as it is desired to effect removal of the assembly 10 from the connector 14, the spring 68 is as to permit disengagement of the leg 70 from the pin 64. Thereafter, the pin 64 may be axially removed and thus permit disassembly of the connector 14 from the blade assembly 10. It will be appreciated, of course, that the wiper blade assembly 10 of the present invention may be operatively associated with various other types of connector mechanisms and that the connector 14 shown in operative association with the blade assembly 10 of the present invention is disclosed merely as an exemplary type of connector mechanism by which the assembly 10 may be secured to an associated wiper arm, such as the arm 12.

In order to effect assembly of the wiper blade 10, the blade member 18 is initially assembled onto the retaining member 20 by inserting the T-shaped section 46 into the slot 52. Thereafter, the one end of the retaining member 20 is positioned in alignment with the superstructure 16 adjacent one of the end stops 34 or 36. The superstructure 16 and retaining member 20 are then moved longitudinally relative to one another, whereby the respective retaining fingers 38 are moved into the slots 48, 50 on the retaining member 20. This procedure is continued until such time as the forward or leading end of the retaining member 20 engages the opposite of the end stops 34 or 36, whereupon the retaining member 20 and blade 18 mounted thereon will be retained against further longitudinal movement by the end stops 34, 36. In order to effect removal of the blade 18 and retaining member 20 from the superstructure 16, the above procedure is merely reversed, and it will be noted that in both the assembly and disassembly operations, it is necessary to deflect or deform one end of the superstructure 16 upwardly or away from the blade 18, as seen in FIG. 6, in order to permit initial longitudinal movement of the retaining member 20 into and out of the confines of the retaining fingers 38; however, due to the resilient nature of the plastic material from which the superstructure 16 is fabricated, such deformation may be easily accomplished without in any way affecting either the structure or operational characteristics thereof.

The superstructure 16 is preferably, although not necessarily, fabricated of a polymeric material identified by the trademark "Lexan" manufactured and distributed by the General Electric Company. While this material has been found to provide the desired operational characteristics and may be easily molded, it will be appreciated that various alternative materials having the requisite resilient characteristics and being suitably moldable may be utilized instead of "Lexan."

It will be seen from the foregoing that the present invention provides a new and improved wiper blade assembly which may be economically fabricated of any suitable polymeric material by well known molding or other fabricating techniques. By virtue of the extreme simplicity of design, no ancillary clips or additional hardware is required to retain the rubber blade on the associated superstructure, thereby minimizing the number of component parts and associated manufacturing costs to the extreme. The windshield wiper assembly of the present invention will be seen to have an extremely low profile or silhouette, as compared to prior art assemblies, thereby minimizing visual obstruction as well as the undesirable windlift effect when the vehicle encounters strong head winds or is traveling at a high rate of speed. An additional feature of the present invention resides in the fact that the blade may be conveniently removed and replaced by merely bending back the end of the superstructure 16 and pulling out the old blade and retaining member. Accordingly, blade replacement may be accomplished in a minimum amount of time. Still another feature of the present invention resides in the fact that the blade assembly may be operatively associated with various types of connector mechanisms, as well as with different type wiper arms, whereby to provide for universality of application. Additionally, of course, it will be appreciated that superior wiping characteristics will be readily achieved by the wiper assembly of the present invention by virtue of the fact that a uniform pressure is exerted along the entire length thereof against the associated windshield, thereby assuring against windshield streaking and the like.

While it will be apparent that the preferred embodiment of the invention disclosed is well calculated to fulfill the objects above stated, it will be appreciated that the invention is susceptible to modification, variation and change without departing from the scope or fair meaning of the subjoined claims.

I claim:

1. A windshield wiper blade assembly comprising,
an elongated flexible arcuate-shaped one-piece superstructure fabricated of a molded plastic material,
said superstructure having a uniform radius of curvature,
connector means located adjacent a central portion of said superstructure for securing the same to an associated wiper arm,
said superstructure having a first retaining means formed intergrally thereon and spaced longitudinally therealong the entire length thereof,
said first retaining means comprising a plurality of downwardly projecting fingers formed integrally of said superstructure and defining a longitudinally extending recess, said fingers being spaced along said superstructure and each having an inwardly projecting distal end portion,
a wiper blade including a resilient windshield engaging wiping lip portion and an upwardly extending mounting portion,
an elongated flexible retaining member fabricated of a molded plastic material secured to and coextensive of said blade,
said retaining member having a first portion insertable into said recess and a pair of laterally opposed longitudinal slots adapted to receive said distal ends of said fingers for securing said retaining member to said superstructure, and a second portion defining a longitudinally extending slot formed along the undeside of said member and adapted to receive said upwardly projecting mounting portion of said blade, whereby said blade assumes said arcuate shape of said superstructure and is thereby adapted to exert a uniform wiping pressure against said windshield,
means for limiting longitudinal sliding movement of said retaining member and said blade relative to said superstructure,
said means for limiting relative movement of said retaining member comprising a pair of integral end stops projecting downwardly from the longitudinally opposite ends of said superstructure and adapted for engagement with the longitudinally opposite ends of the assemblage of said retaining member and blade for limiting longitudinal sliding movement thereof, and means for providing torsional stiffness at the opposite ends of said superstructure and comprising a pair of generally uniform rectangular crosssectional shaped end protions on said superstructure so as to maintain the opposite ends of said blade in wiping engagement with the associated windshield during oscillatory movement of said assembly, each of said end protions extending inwardly to a location approximately one third of the distance beytween said end stops and the central portion of said superstructure, said one peice superstructure being formed with an integral upwardly projecting reinforcing rib having a maximum thickness at said central portions of said superstructure and gradually tapering to a minimum thickness at said inward locations of said end protions.

* * * * *